Sept. 26, 1961  J. B. JONES ET AL  3,001,805
DUCT CONNECTOR
Filed Nov. 18, 1957
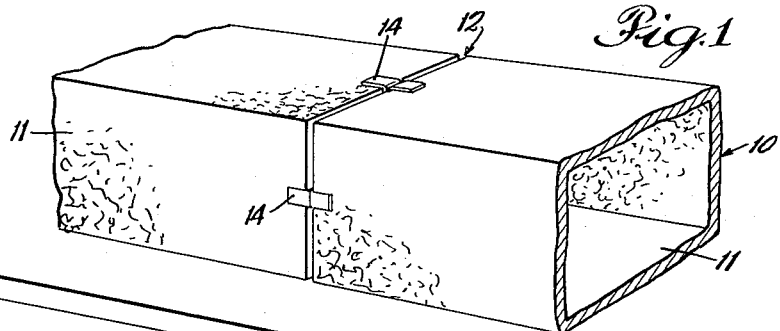
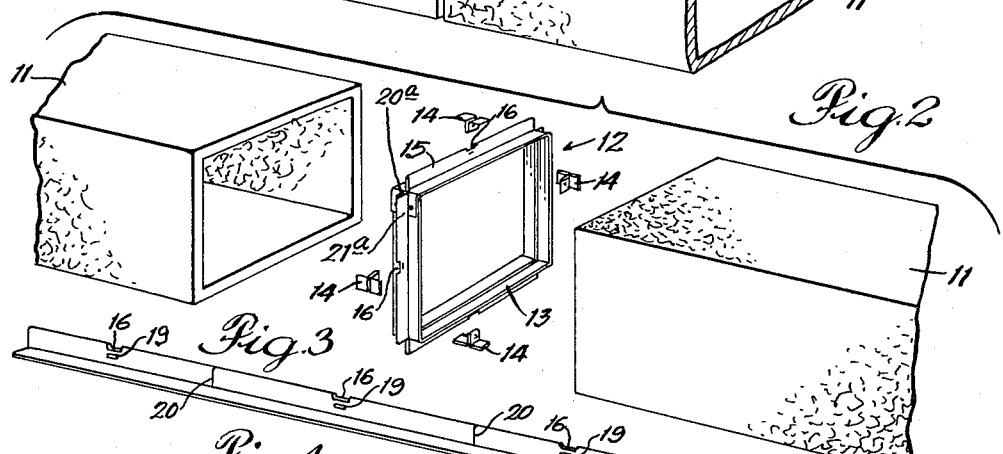
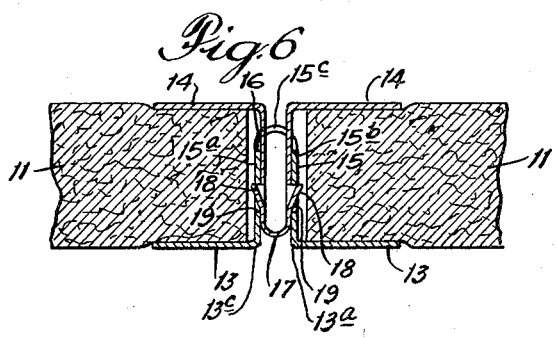
INVENTORS:
Jo B. Jones and
Robert H. Buehler,
BY
ATTORNEYS.

United States Patent Office 3,001,805
Patented Sept. 26, 1961

3,001,805
DUCT CONNECTOR

Jo B. Jones and Robert H. Buehler, Wichita, Kans., assignors to The Coleman Company, Inc., Wichita, Kans., a corporation of Kansas
Filed Nov. 18, 1957, Ser. No. 697,285
2 Claims. (Cl. 285—397)

This invention relates to a duct connector and more particularly to a connector useful for uniting ducts constructed of a semi-rigid material.

Despite the fact that it is desirable to use semi-rigid material to construct ducts (as where a corrosion problem exists), the use of such material has been seriously hampered in the past because of the unavailability of suitable connecting devices. The necessary characteristics of a connector for semi-rigid ducts include the ability to support the ducts against distortion resulting from both negative and positive internal pressures. It was felt that this could not be done without going to such a heavy connector (in contrast to the slight rigidity of the ducts themselves) as to make the installation not feasible. A distinct problem has arisen therefore in that a lightweight, strong connector is needed for ducts, especially those constructed of semi-rigid material.

It is an object of this invention to provide a novel structure that overcomes the problems and disadvantages outlined above. Another object is to provide a novel type of duct connector. Still another object is to provide a duct connector which is especially suitable for uniting ducts constructed of semi-rigid material. Yet another object is to provide a lightweight, strong duct connector that can be readily assembled at the site of installation. Other objects and advantages of this invention can be seen as this specification proceeds.

This invention will be explained in an illustrated embodiment, in conjunction with the accompanying drawing in which:

FIGURE 1 is an elevational view of a duct connector embodying teachings of this invention shown uniting fragmentary portions of two ducts; FIGURE 2 is an elevational view similar to FIGURE 1 but exploded to show the various cooperating portions of the duct connector; FIGURE 3 is an elevational view of the frame portion of the connector prior to installation; FIGURE 4 is a perspective view of a clip used in combination with the frame seen in FIGURE 3; FIGURE 5 is an enlarged fragmentary view of a portion of the frame seen in FIGURE 3; and FIGURE 6 is a cross-sectional view of the connector of this invention as would be seen by taking a longitudinal section through the ducts seen in FIGURE 1.

In the illustration given, the numeral 10 designates generally a duct which is seen to include duct sections 11 joined together by a connector generally designated 12. In the illustration seen in the drawing, the duct sections 11 have a rectangular configuration, but it is to be appreciated that other polygonal configurations can be employed in the use of the connector of this invention.

Referring now to FIGURE 2 wherein the duct and connector structure of FIGURE 1 are seen in an exploded form, the numeral 13 designates a frame and the numeral 14 designates clips associated with the frame to establish connection between duct sections 11.

Frame 13 can also be seen in FIGURES 3 and 5. In those figures, frame 13 is seen to include an elongate strip folded upon itself along a plurality of spaced parallel, longitudinally extending lines (i.e. 13a, 13b and 13c in FIGURE 5) to form a member having a T-shaped cross-section. The base of the T-shaped cross-section is designated by the numeral 15 and is seen to include parallel upstanding walls 15a and 15b united at the end 15c of the base of the T-shaped cross-section. Excellent results have been obtained when frame 13 is constructed of sheet metal.

Provided in the end 15c of base 15 of frame 13 is a plurality of notched out portions or apertures 16. Received in apertures 16 are the base portions 17 of T-shaped clips 14, the cross-sectional configuration of clip 14 being readily appreciated from a consideration of FIGURE 4.

Clip 14 is provided with outstanding lugs or ears 18 which cooperate with openings 19 in base 15 as seen in FIGURE 6 to lock clip 14 securely within base 15 of frame 13. The clips 14 also can be constructed of sheet metal in which case ears 18 can be struck from central portions of the base 17 of clips 14.

Frame 13 as seen in FIGURE 3 is in the form found especially suitable for shipping wherein it is a straight, easily packaged length. A plurality of cuts or interruptions 20 are provided along the length of frame 13 as seen in FIGURE 2 which permit the transverse bending of frame 13 to provide a polygonal configuration with the points of severance 20 at the corners of the frame when completed and which is indicated by the numeral 20a in FIGURE 2.

The frame 13 seen in FIGURE 2 can be constructed of a single length such as seen in FIGURE 3 by transversely folding the frame 13 at the interrupted portions 20 and then overlapping one end 21 as at 21a in FIGURE 2. The overlapped portions can be united by staking, crimping, bolting, riveting, etc.

Thus, it is to be seen (especially from FIGURE 6) that the clips 14 and the frame 13 cooperate to provide a connector having an H-shaped cross-section and which operates to secure ducts 11 securely together so as to resist distortion derived from both negative and positive internal pressure.

While, in the foregoing specification, a specific structure has been set forth in considerable detail as a means for illustrating the invention, it will be understood that, such details may be varied widely by those skilled in the are without departing from the spirit of this invention.

We claim:

1. A connector for polygonal ducts constructed of semi-rigid material, comprising a polygonally configured frame provided by uniting together in overlapping relation the ends of an elongated sheet metal strip formed into a T-shaped cross-section by folding said strip upon itself along a plurality of spaced, parallel, longitudinally extending lines, said T-shaped strip having its base interrupted at least at points corresponding to the corners of the polygonal configuration, said base also being equipped with at least two spaced-apart, transversely aligned openings therein intermediate the points of interruption, and a T-shaped clip mounted in said base in one of said transversely aligned openings, said clip being equipped with an ear portion which lockingly engages another of said transversely aligned openings.

2. In a connector for uniting semi-rigid ducts, an elongated frame formed by bending a rigid sheet metal strip upon itself along a plurality of spaced, parallel, longitudinally-extending lines to provide a member having a T shape in cross-section, the base of said member including spaced-apart parallel walls united at the end of said base, a plurality of clip-receiving apertures spaced along the length of said base between the said spaced-apart parallel walls thereof, and a plurality of T-shaped clips positioned in said apertures, said parallel walls of said frame being provided with a plurality of openings, the bases of said clips being provided with outwardly-extending lugs received in said openings.

(References on following page)

References Cited in the file of this patent

UNITED STATES PATENTS

| | | | |
|---|---|---|---|
| 777,981 | Sterling | Dec. 20, | 1904 |
| 1,658,043 | Eaglesfield | Feb. 7, | 1928 |
| 2,112,247 | McLaughlin | Mar. 29, | 1938 |
| 2,123,410 | Fawcett | July 12, | 1938 |
| 2,128,005 | Lombard | Aug. 23, | 1938 |
| 2,219,714 | Sperry | Oct. 29, | 1940 |
| 2,319,058 | Hansman | May 11, | 1943 |
| 2,448,107 | Mattimore | Aug. 31, | 1948 |
| 2,462,721 | Cohen | Feb. 22, | 1949 |
| 2,552,805 | Murphy | May 15, | 1951 |